United States Patent [19]

Ono et al.

[11] 4,257,261

[45] Mar. 24, 1981

[54] METHOD AND APPARATUS FOR CONTROLLING LOAD OF DYNAMOMETER

[75] Inventors: Masamichi Ono, Yokohama; Akira Eto, Hino; Hideji Yagi, Kawasaki, all of Japan

[73] Assignee: Kabushiki Kaisha Ono Sokki Seisakusho, Tokyo, Japan

[21] Appl. No.: 955,632

[22] Filed: Oct. 30, 1978

[30] Foreign Application Priority Data

May 25, 1978 [JP] Japan ................................. 53-62574

[51] Int. Cl.³ .............................................. G01L 3/22
[52] U.S. Cl. .................................................... 73/134
[58] Field of Search ....................... 73/117, 133 R, 134

[56] References Cited

U.S. PATENT DOCUMENTS

| | | | |
|---|---|---|---|
| 2,785,367 | 3/1957 | Roman et al. | 73/117 X |
| 3,581,561 | 6/1971 | Tomashek | 73/113 R |
| 3,657,922 | 4/1972 | Sibevd | 73/133 R |

*Primary Examiner*—Charles A. Ruehl
*Attorney, Agent, or Firm*—J. Harold Nissen

[57] ABSTRACT

A method and apparatus for controlling the load of a dynamometer. While the dynamometer is driven or coasted with a plurality of armature currents properly selected between $-100\%$ and $+100\%$ of the rated armature current, each time value it takes the dynamometer speed to vary from one preset speed level to the next preset speed level is measured and converted into a load value which is then stored together with the corresponding dynamometer speed and armature current values. Proper load, speed and current values are read out in accordance with a given targeted load and dynamometer speed for calculation of a targeted control current corresponding to the targeted control load using interpolation.

9 Claims, 4 Drawing Figures

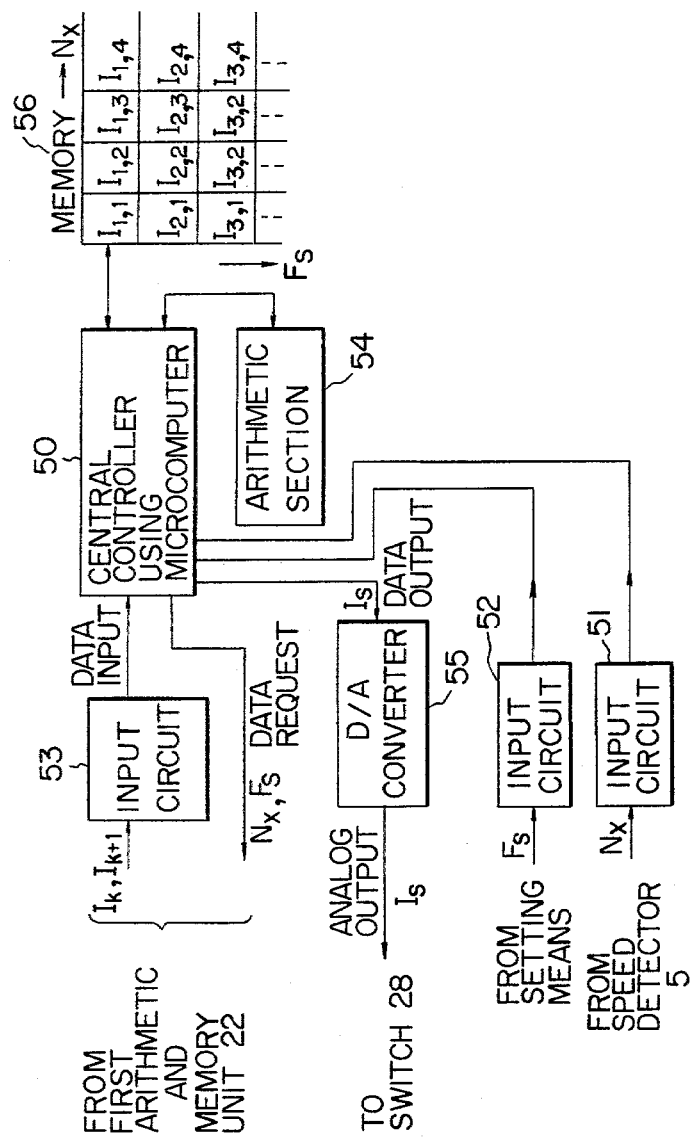

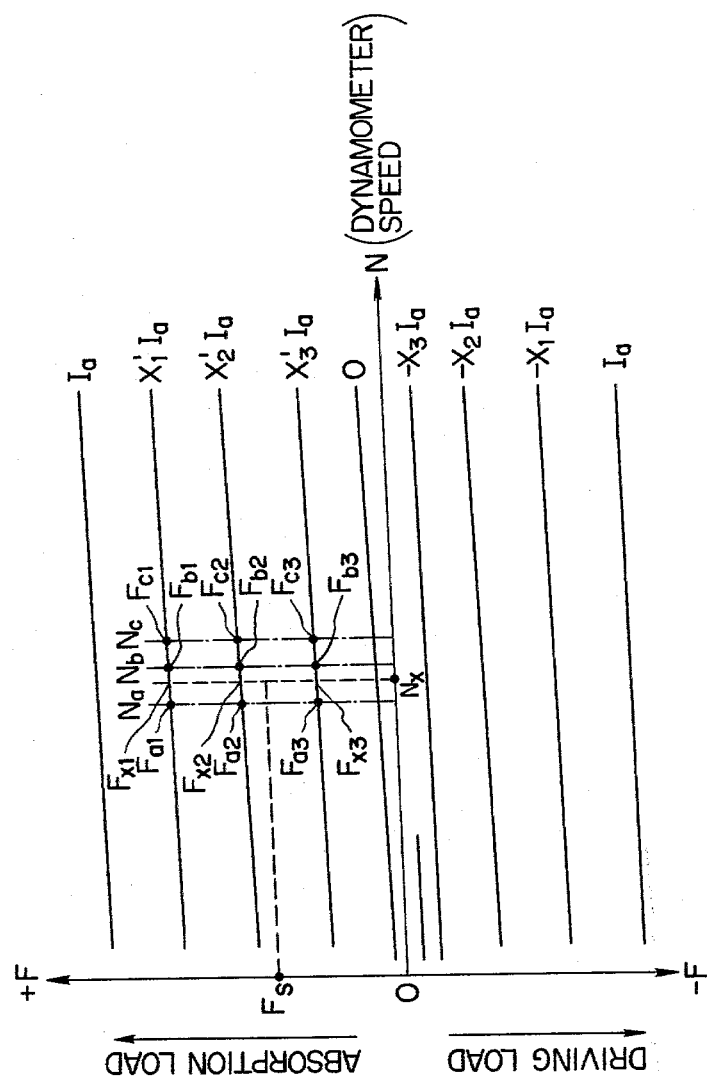

METHOD AND APPARATUS FOR CONTROLLING LOAD OF DYNAMOMETER

BACKGROUND OF THE INVENTION

1. Field of the Invention

The invention relates to the precise control of operation of a dynamometer and, more particularly, to a method and apparatus for controlling the driving (or motoring) or absorption load of a dynamometer to a targeted control level with great accuracy.

2. Description of the Prior Art

FIG. 1 is an illustrative block diagram of a conventional dynamometer load control apparatus which comprises a mechanical section including a dynamometer 1 having a rotary shaft 2 carrying at its one end an object 4 under test and at the other end a flywheel 3 for compensating the inertia term of the test object 4, a detecting section including a speed detector 5 for detecting the speed of the dynamometer 1, a torque detector 6 for detecting the load of the dynamometer 1, a current detector 7 for detecting the current flowing through the armature, and a voltage detector 8 for detecting the armature voltage, and a control section including a current adjustor 11 for adjusting the field current flowing through the field winding 10 of the dynamometer 1, an armature voltage adjustor 15, and control amplifiers 12 to 14 for providing a control output to the armature voltage adjustor 15.

The flywheel 3 may be removed if the control section is arranged so as to additionally control the inertia term of the test object 4. Although the present invention will be described in connection with the chassis dynamometer system, it is to be understood that the test object 4 may be set in an engine dynamometer fashion where an engine is directly set on the rotary shaft 2 or in a chassis dynamometer fashion where a vehicle is set on a roller coupled to the rotary shaft 2. Since the armature voltage adjustor 15 serves to control the armature voltage whether it is of the Ward Leonard type using a dynamo or of the thyristor type using a thyristor, it will be hereinafter referred merely to as a voltage adjustor. Additionally, since the field current adjustor 11 serves to adjust the field current flowing through the field winding 10 of the dynamometer 1 and thus the magnetic flux density of the dynamometer 1, it will be hereinafter referred merely to as a magnetic flux adjustor.

With such a conventional control system, the load of the dynamometer 1 is controlled as follows: The speed N of the dynamometer 1 is detected by the speed detector 5 and is introduced into the magnetic flux adjustor 11 which adjusts the field current $I_f$ flowing through the field winding 10 in accordance with the detected speed N such that the voltage $V_d$ (the product of the magnetic flux density $\phi$ and the speed N of the dynamometer) induced with rotation of the armature across the dynamometer 1 can be maintained substantially constant in order that the armature current I can be determined as a function of the control voltage of the voltage adjustor 15. On the other hand, the first control amplifier 12 receives a targeted control load $F_s$ and a load F detected by and delivered from the torque detector 6 and calculates the deviation between these two values and converts it into current form as a targeted control current $I_s$. The second control amplifier 13 receives the targeted control current $I_s$ delivered from the first control amplifier 12 and also an armature current I detected by and delivered from the current detector 7 and calculates the deviation between these two values and converts it into voltage form as a targeted control voltage $V_s$. The third control amplifier 14 receives the targeted control voltage $V_s$ delivered from the second control amplifier 13 and also a voltage V detected by and delivered from the voltage detector 8 and calculates the deviation between these two values to control the voltage level of the voltage adjustor 15. The armature current I provided under this control is given by $$I=(V_d-V_g)/R \tag{1}$$

where $V_d$ is the voltage induced by the dynamometer 1, $V_g$ is the control voltage of the voltage adjustor 15, and R is the total resistance of the armature circuit. The load generated in the dynamometer 1 with this armature current I is expressed by $$F=K\phi I \tag{2}$$

where K is a constant determined by the kind of the dynamometer.

As can be seen from Equation (1), the direction of flow of the armature current I is dependent upon the relationship in magnitude between $V_d$ and $V_g$. For example, the armature current I will flow in the direction indicated by the solid line of FIG. 1 and an absorption load is generated in the dynamometer 1 if $V_d > V_g$, whereas it will flow in the reverse direction as indicated by the broken line of FIG. 1 and a driving load is generated in the dynamometer 1 if $V_d < V_g$.

In such a conventional control system wherein the load F detected by the torque detector 6 is utilized as a feedback value for controlling the load of the dynamometer 1 as heretofore stated, the load F is required to be detected with great accuracy in order to provide precise dynamometer load control. However, the load F is normally obtained by detection of the reaction force of the rocking portion of the dynamometer 1. Thus, the load F cannot be detected in the range where it changes between the driving and absorption load states and also cannot be accurately detected in the small-load range due to the characteristic inherent in the torque detector.

In order to eliminate these difficulties, it has been proposed in an effort to calculate the load from the armature current I and the magnetic flux density $\phi$ in accordance with Equation (2). Unfortunately, it has been known for such an effort to be ineffective. Any attempt to calculate the magnetic flux density $\phi$ assuming that it is proportional to the field current $I_f$ will cause a great error and also any attempt to calculate the magetic flux density $\phi$ from measurable values such as the armature current I, its differentiated value, the terminal voltage, and the dynamometer speed will result in a value insufficient in accuracy.

SUMMARY OF THE INVENTION

In view of the foregoing factors and conditions of the prior art, it is a primary object of the present invention is to eliminate the above disadvantages and limitations.

Another object of the present invention is to provide a method and apparatus for controlling the load of a dynamometer with great accuracy.

In accordance with the present invention, a novel and improved dynamometer load control method and apparatus is provided. The main feature of the present invention is to calculate the dynamometer load from the dynamometer speed and the time it takes the dynamometer speed to vary from one preset speed level to the next preset speed level which can be measured with great accuracy. Each time value it takes the dynamometer speed to vary from one preset speed level to the next preset speed level is measured while the dynamometer is driven or coasted with a plurality of armature currents properly selected between $-100\%$ and $+100\%$ of the rated armature current. Dynamometer load values for the respective armature currents are calculated from the measured times and the corresponding preset speed levels, for example, in accordance with the equipment given by $F = K_1(N_{i+1} - N_i)/T_i$, where $N_i$ is one preset speed level, $N_{i+1}$ is the next preset speed level, $T_i$ is the time it takes the dynamometer speed to vary from the one preset speed level to the next preset speed level, and $K_1$ is a constant. The calculated dynamometer load values are stored together with the corresponding dynamometer speed and armature current values and proper load, speed and current values are read out in accordance with a given targeted load and dynamometer speed for calculation of a targeted control current corresponding to the targeted control load using interpolation.

Alternatively, dynamometer power values may be calculated from the measured times and the corresponding preset speed levels, for example, in accordance with the equipment given by $P = K_2 \cdot (N_{i+1}^2 - N_i^2)/T_i$, where $N_i$ is one preset speed level, $N_{i+1}$ is the next preset speed level, $T_i$ is the time it takes the dynamometer speed to vary from the one preset speed level to the next speed level, and $K_2$ is a constant, in which case the calculated power values are stored together with the corresponding dynamometer speed and armature current values and proper power, speed and current values are read out in accordance with the product of a given targeted control load and dynamometer speed for calculation of a targeted control current corresponding to the targeted control load using interpolation.

The dynamometer load control apparatus comprising a reference current generator for providing a plurality of reference currents properly selected between $-100\%$ and $-100\%$ of the rated armature current for driving or coasting the dynamometer with the reference currents flowing through the armature of the dynamometer, a multistage preset timer having a number of preset speed levels for measuring each time value it takes the dynamometer speed to vary from a preset speed level to the next preset speed level while the dynamometer is driven or coasted with the respective armature currents, a first arithmetic and memory unit for calculating dynamometer load values for the respective armature currents from the measured time values and the corresponding preset speed levels and storing the calculated load values together with the corresponding dynamometer speed and armature current, and a second arithmetic and memory unit responsive to a targeted control load and a dynamometer speed for reading out proper load, speed and current values stored in the first arithmetic and memory unit to provide a targeted control current corresponding to the targeted control load using interpolation.

BRIEF DESCRIPTION OF THE DRAWINGS

A better understanding of the present invention as well as other objects and further features thereof will become apparent upon consideration of the following detailed disclosure thereof, especially when taken with the accompanying drawings, wherein like numerals designate like parts throughout.

FIG. 7 is a schematic block circuit diagram of arithmetic memory unit block 23 of FIG. 2; and FIG. 8 is a diagram used to explain the interpolation utilized in the present invention.

DESCRIPTION OF THE PREFERRED EMBODIMENT

Figure 1:
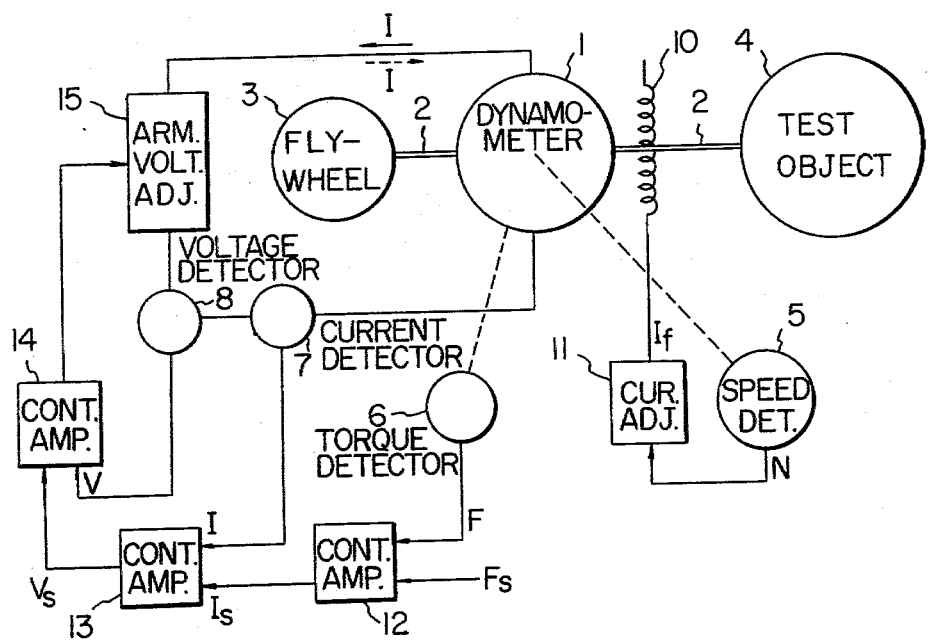
FIG. 1 is an illustrative block diagram showing the construction of a conventional dynamometer load control system.
Figure 2:
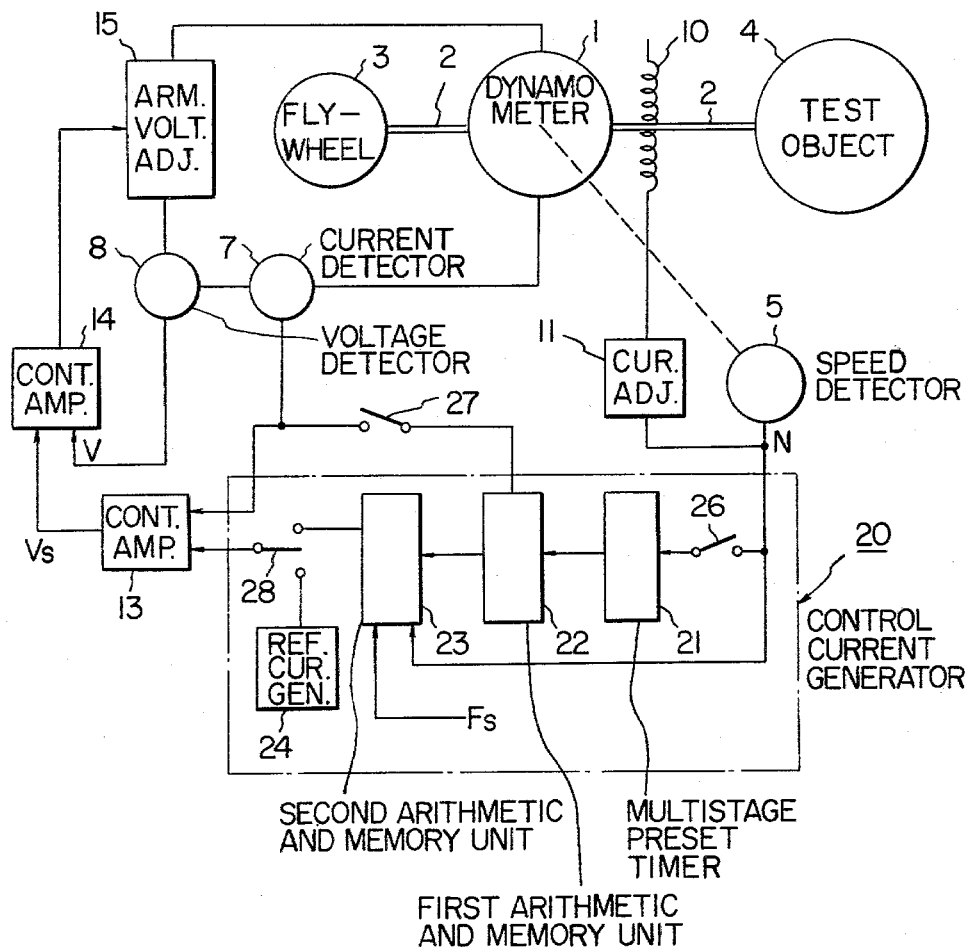
FIG. 2 is an illustrative block diagram showing one embodiment of the dynamometer load control system of the present invention.

The present invention is now described in detail by way of the embodiment of FIG. 2. The load control apparatus is shown in association with a dynamometer 1 having a rotary shaft 2 carrying at its one end an object 4 being tested and at the other end a flywheel 3 for compensating the inertia term of the test object 4 and is constructed of the conventional parts of a speed detector 5, a current detector 7, a voltage detector 8, a magnetic flux adjustor 11, control amplifiers 13 and 14, and a voltage adjustor 15 which are similar in structure and operation to those described in connection with the conventional load control apparatus of FIG. 1. The chief difference between FIGS. 1 and 2 load control apparatus is that a control current generator 20 is employed for providing a targeted control current to the control amplifier 13 without the use of the torque detector 6 and the control amplifier 12.

The control current generator 20 comprises a multistage preset timer 21 having therein a number of preset speed levels. Multistage preset timer 21 is a conventional timer sold under Model GT-713, 720,730 by ONO SOKKI Scisakusho and known under the brand name of "COAST DOWN METER". The multistage preset timer 21 receives the speed N of the dynamometer 1 detected by and delivered through a switch 26 from the speed detector 5 for measuring each time value it takes the dynamometer speed N to vary from a preset speed level to the next preset speed level. The measured times and the corresponding preset speed levels are delivered to a first arithmetic and memory unit 22 which includes an A/D converter and a conventional 8080 computer manufactured and sold by INTEL CORPORATION to calculate dynamometer load values from the measured times and the corresponding preset speed levels and stores the calculated load values together with the corresponding average speed values of the respective preset speed level pairs and the corresponding armature current values detected by and delivered through a switch 27 from the current detector 7. A second arithmetic and memory unit 23 which includes a D/A converter and a conventional central controller which receives a dynamometer speed N detected by and delivered from the speed detector 5 and also a targeted control load $F_s$. The second arithmetic and memory unit 23 is responsive to the dynamometer speed N and the targeted control load $F_s$ for reading out proper load, speed and current values stored in the first arithmetic and memory unit 22 to calculate a targeted control current $I_s$ corresponding to the targeted control load $F_s$. The resulting targeted control current $I_s$ is introduced through a switch 28 to the control amplifier 13. The control current generator 20 also comprises a reference current generator 24 for providing a plurality of reference currents properly selected between −100% and +100% of the rated armature current which are introduced through the switch 28 to the control amplifier 13. The switch 28 is drivingly associated with the switches 26 and 27 such that the switches 26 and 27 are closed only when the switch 28 is changed over to connect the reference current generator 24 to the control amplifier 13. For example, microprocessors may be used to construct these circuits.

The dynamometer load control of the present invention includes two steps of measuring dynamometer driving or absorption load values which are calculated from the time values measured whenever the dynamometer speed varies from a preset speed level to the next speed level while the dynamometer is driven or coasted with a plurality of properly selected armature currents, and controlling the dynamometer load with a targeted control current corresponding to a targeted control load which is calculated from the measured load values.

Dynamometer Load Measurement

Figure 3:
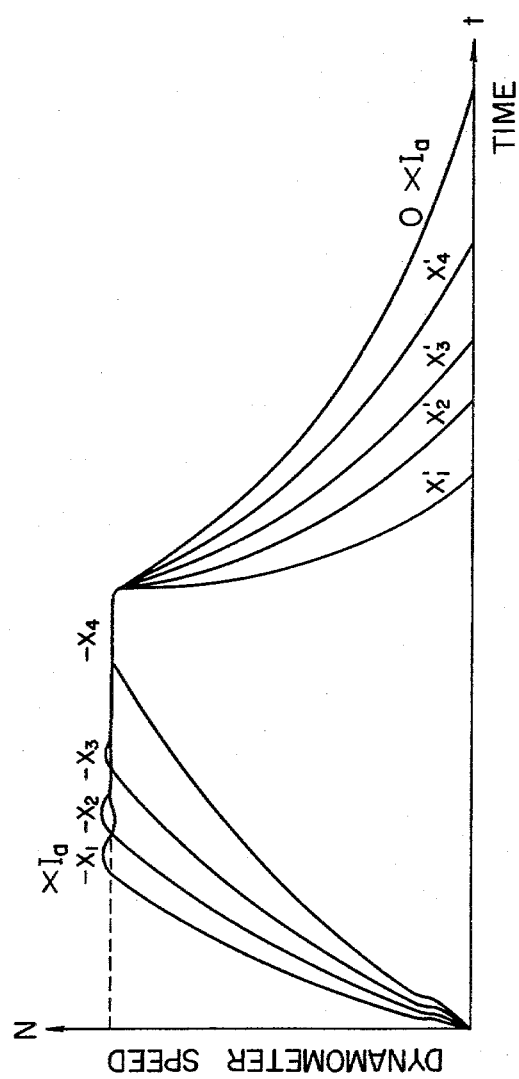
FIG. 3 is a graph showing dynamometer speed versus time for different operating conditions with a number of armature currents.

The switch 28 is placed to connect the reference current generator 24 to the control amplifier 13, in which case the switches 26 and 27 are closed. First the dynamometer 1 is driven to provide a driving load with the reference current generator 24 set to provide a −x% of the rated armature current $I_a$ until the dynamometer speed N reaches a predetermined level and then the dynamometer 1 is coasted to produce an absorption load with the reference current generator 24 set to provide a +$x_1$% of the rated armature current $I_a$. This operation is repeated with the reference current generator 24 set to provide reference currents $-x_1 I_a$, $-x_2 I_a$, $-x_3 I_a$, ... 0 ... $+x'_3 I_a$, $+x'_2 I_a$, $+x'_1 I_a$ properly selected between −100% and +100% of the rated armature current $I_a$. As can be seen from FIG. 3 showing the dynamometer speed N as a function of time t, the larger the absolute value of the armature current I, the shorter the time it takes the dynamometer speed to reach the predetermined level or the coasting time. Although the predetermined speed level is determined by the speed of the test object, it is to be understood, of course, that the dynamometer may be driven with a current balanced below the predetermined speed level in order to permit any small load to be detected.

During the operations, the speed N of the dynamometer 1 is continuously detected by the speed detector 5 and delivered through the switch 26 to the multistage preset timer 21, to be described hereinafter in more detail, which compares the speed N with a number of preset speed levels to sequently measure the time $T_i$ whenever the speed N varies from a preset speed level $N_i$ to the next preset speed level $N_{i+1}$. For example, a speed detector of the type providing pulses having their pulse durations indicating the dynamometer speed N may be associated with a multistage preset timer of the type having a number of periodic preset levels corresponding to the preset speed levels for providing immediate comparison of the speed N with the preset speed levels. Clock pulses generated from a crystal oscillator may be used to measure the time $T_i$ it takes the speed N to vary between two preset speed levels with greater accuracy.

Figure 5:
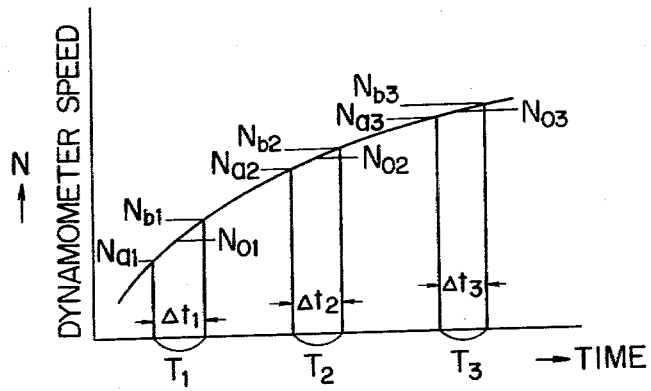
FIG. 5 is a graphical representation showing dynamometer speed versus time for different operating conditions of the multistage preset timer of FIG. 4.
Figure 4:
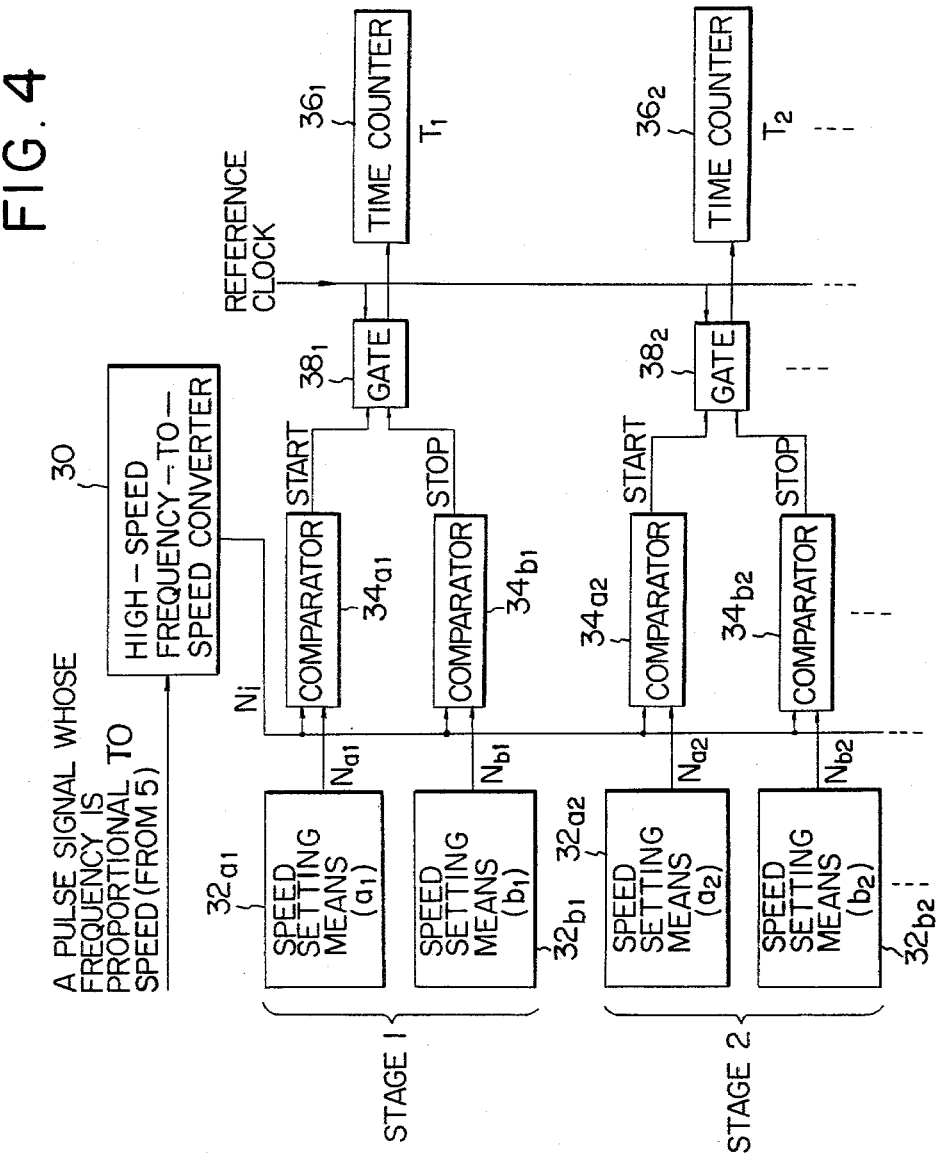
FIG. 4 is a schematic block circuit diagram of multistage preset timer block 21 of FIG. 2.

Referring to FIGS. 4 and 5, further detailed description on the above-mentioned multistage preset timer 21 is given.

These kind of timers 21 were available under the trade name "COAST DOWN METER" before the corresponding Japanese (parent) application K.K. No. 62574/78 was filed. Applicant, ONO SOKKI SEISAKUSHO, is one of the manufacturers and sells such timers as models GT-713, 720, 730, ...

These timers measure a time period $T_i$ which it takes a moving object under test to accelerate or decelerate from one preset speed $N_a$ to another $N_b$. Not only one stage including $(N_a, N_b)$ but also a plurality of stages (for example 3 to 15 stages) of $(N_{a1}, N_{b1},) (N_2, B_{b2}), \ldots$ are presettable. By knowing these acceleration and deceleration time periods, the forces exerted on the moving object are given by $$m \cdot dN/dt$$

Newton's second equation of motion
where
F is the force (Newtons) exerted on the object,
m is the mass of the object (Kg),
N is the speed (m/sec) of the object, and
t is time sec
From the above equation, $$m \cdot (N_b - N_a)/T_i$$

In order to determine the magnitudes of the forces exerted on the object at the respective correspondng speeds while the speed of the object is changing with time, as shown in the attached FIG. 5, knowledge of m, $N_a$, $N_b$, $T_i$ will suffice. $N_a$, $N_b$ are usually selected to be approximately 10% either side of the value of the speed $N_o$ to be measured. The mass m is the value inherent to the object and is separately measured. FIG. 5 illustrates substantially the same as FIG. 3.

In the same way, if the object is a revolving body, the torque acting on the body is given by $$T = I \, d\omega/dt$$

where
$$T_q = I \, d\omega/dt$$

where
$T_q$ is the torque (Newton × m) exerted on the revolving body;
I is the moment of inertia of the revolving body, and
ω is the angular velocity of the body;

$$\therefore T_q = I \cdot (\omega_b - \omega_a)/T_i$$

The above is the principle of measuring the force or torque, using a multistage preset timer.

The actual structure of a multistage preset timer 21 is described referring to FIG. 4 which is a block diagram thereof.

A pulse signal, from the speed detector 5, whose frequency is directly proportional to a speed (or angular velocity), is converted by a high speed frequency-to-speed converter 30 to a corresponding speed signal $N_i$. (The time required for this conversion is about 1 to 10 msec.) The speed signal may be expressed by an analog or digital signal. If an analog signal is used, the signals from a plurality of speed setting means $32_{a1}$, $32_{b1}$; $32_{a2}$, $32_{b2}$; . . . to be described hereinafter in more detail should be analog signals. Accordingly, corresponding comparators $34_{a1}$, $34_{b1}$; $34_{a2}$, $34_{b2}$; . . . which receive reference values from the corresponding speed setting means should be of an analog type. If a digital signal is used, the signal from the speed setting means should be of digital values; for example, for this purpose, digital setting means usually called "digital switches" can be used and therefore the comparators of digital type should be used. The speed setting means, which may be potentiometers or digital switches, are presettable to output $N_{a1}$, $N_{b1}$; $N_{a2}$, $N_{b2}$; . . . , shown in FIG. 5.

The comparator $34_{a1}$ compares a set speed $N_{a1}$ with an actual speed $N_i$ from the converter 30 to produce, the moment $N_i$ becomes larger than $N_{a1}$, a start signal which starts a time counter $36_1$ through a gate $38_1$. On the other hand, the comparator $34_{b1}$ compares $N_{b1}$ with $N_i$ to produce, the moment $N_i$ becomes larger than $N_{b1}$, a stop signal which stops the time counter $36_1$. Each time counter counts clock pulses from each start signal to the corresponding stop signal. The contents of each counter indicate a time period $T_i$ taken from $N_a$ to $N_b$. These measured values $T_1, T_2, \ldots$ are displayed and are output to external devices. Other than first and second stages are not shown in FIG. 4 but can be provided as desired.

The preset speed levels $N_i$ and $N_{i+1}$ and the time $T_i$ it takes the dynamometer speed N to vary between the speed levels $N_i$ and $N_{i+1}$ are introduced to and stored in the first arithmetic and memory unit 22 which calculates a driving or absorption load from them in accordance with the following equation:

$$F = \frac{W}{g} \cdot \frac{dN}{dt} \approx K_1 \cdot \frac{(N_{i+1} - N_i)}{T_i} \quad (3)$$

where W is the equivalent weight of the rotatable portion of the dynamometer, g is the acceleration of gravity, and $K_1$ is a constant.

After the calculation of the driving or absorption load, the first arithmetic and memory unit 22 stores the calculated load and the average speed $(N_{i+1} + N_i)/2$ together with the corresponding armature current $I_i$ detected by and delivered through the switch 27 from the current detector 7. As a result, filed in the first arithmetic and memory unit 22 are speeds and loads in correspondence to respective armature currents of $-x_1$, $-x_2$, $-x_2$, . . . 0 . . . $+x'_3$, $+x'_2$, $+x'_1$% of the rated armature current $I_a$. If the armature current varies during the detecting operation, interpolation may be used to correct the calculated load in accordance with the deviation between the armature current $I_i$ and the reference current $xI_a$.

Figure 6:
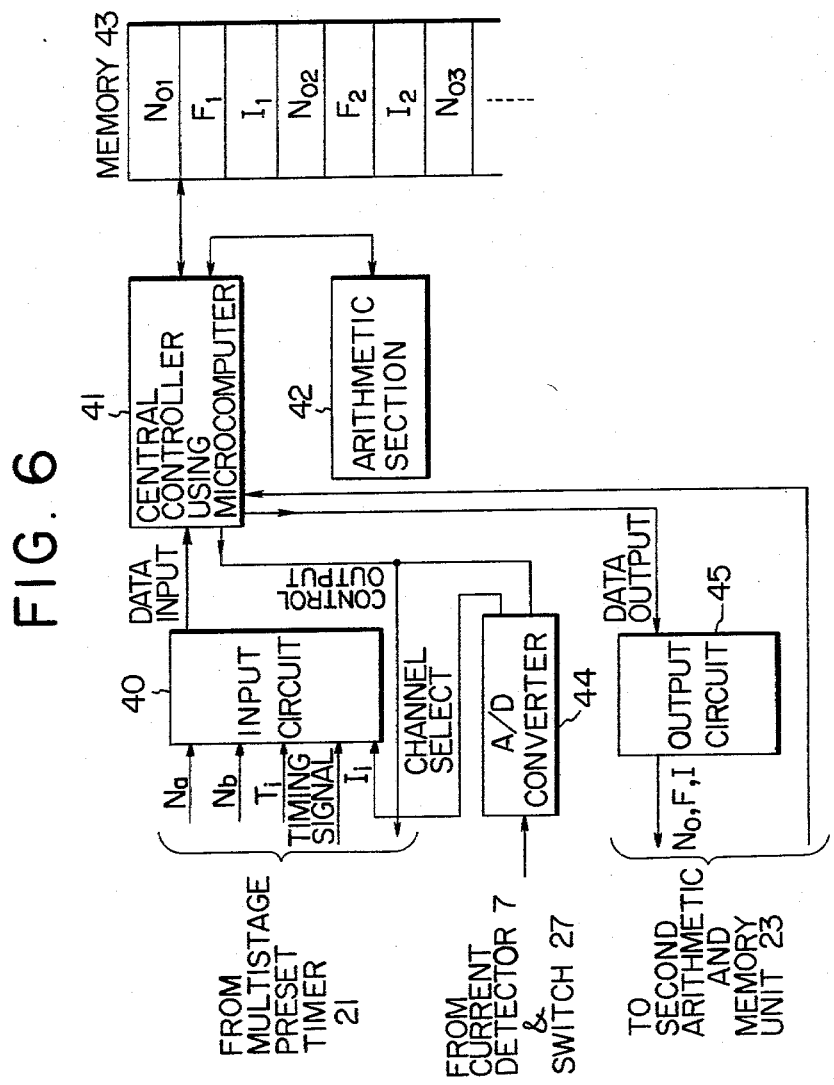
FIG. 6 is a schematic block circuit diagram of arithmetic and memory unit block 22 of FIG. 2.

Referring to FIG. 6, the first arithmetic and memory unit 22 will be further described in more detail.

This block 22, shown in FIG. 6, receives from block 21 set values Na, Nb and the measured time Ti and calculates a drive or brake force $F = m \cdot (N_b - N_a)/T_i$ at speed $N = (N_a + N_b)/2$, the resulting $F_1 F_2 \ldots$, corresponding speeds and corresponding $(N_{a1} + N_{b1}/2)$, $(N_{a2} + N_{b2}/2), \ldots$, armature currents are stored in the a43 memory. An analog to digital converter 44 is provided and converts the voltage signals indicative of the armature currents to corresponding digital values. These electric current values $I1, I2, \ldots$ are caused to correspond to $F1, F2, \ldots$ by timing signals which are produced from the timer 21 at the respective speeds $N_{01}(=N_{a1}+N_{b1}/2)$, $N_{02}, \ldots$ When the FIG. 6 device sends a channel select signal which indicates the need for a certain stage of data to the multistage preset timer 21, this timer outputs $N_a, N_b$, and $T_i$ for the selected stage to the block 22. These numerical data pass through an input circuit 40 to a central controller 41 and an arithmetic section 42 where F a drive or brake represented by the equation $m \cdot (N_b - N_a)/T_i$ is calculated. The central controller 41 may be for example an 8080 microcomputer manufactured and sold by INTEL Corporation and controls inputs and outputs, the arithmetic section 42, and transferring data into and out of a memory 43. Usually, the above calculations are made, including the calculation of $N_0 = (N_a + N_b)/2$, sequentially from stage 1 in FIG. 4 to the subsequent stages, and the calculated values of F an $N_0$ are stored in the memory 43, and the corresponding armature currents I are stored in the memory 43. An analog to digital converter 44 is provided which converts the analog values indicating the armature currents to corresponding digital values. These armature current values $I_1, I_2, \ldots$ are made to correspond to $F_1, F_2, \ldots$ by timing signals which are produced from the timer 21 at the respective average speeds $N_{01}(=N_{a1}+N_{b1}/2)$, $N_{02}, \ldots$

Dynamometer Load Control

The switch 28 is changed over to connect the second arithmetic and memory unit 23 to the control amplifier 13, in which case the switches 26 and 27 are open. The second arithmetic and memory unit 23 and more particularly a central controller 50 receives a dynamometer speed $N_x$ detected by the speed detector 5 and a targeted control load $F_s$ through input circuits 51 and 52, respectively, for reading at least three speeds, in the vicinity of the speed $N_x$, at least three loads in the vicinity of the targeted control load $F_s$, and the corresponding armature currents through an input circuit 53 from ones stored in the first arithmetic and memory unit 22 and applying, for example, Lagrangian interpolation to these read values in an arithmetic section 54 so as to provide through a D to A converter 55 a targeted control current $I_s$ corresponding to the dynamometer speed $N_x$ and the targeted control load $F_s$. This is now described in more detail with reference to FIGS. 7 and 8.

In FIG. 7, there is shown the structure of the second arithmetic and memory unit 23.

Since the data stored in the first memory are discrete, they can not be used as they are without using interpolation, in order to control the dynamometer. Thus, a targeted force $F_s$ is determined, and the current Is which gives the $F_s$ is obtained by interpolation when the present speed $N_x$ is determined as follows;

From the data stored in the first memory, n is selected which satisfied the following expression:

$$N_n = N_x = N_{n+1}$$

and 1, m are selected such that the point $N_x$, $F_s$ is contained within a rectangle defined by four points ($N_n$, $F_l$), ($N_n$, $F_{l+1}$) ($N_n+i$), ($N_n+i$, $F_m$) and ($N_n+1$, $F_m+1$).

Thus an armature current $I_s$ corresponding to ($N_x$, $F_x$) can be expressed, using proportional interpolation, by $$I_s = I_k + (I_{k+1} - I_k)$$
$$\frac{F_s(N_{n+1} - N_n) - F_l(N_{n+1} - N_x) - F_{l+1}(N_x - V_n)}{(N_{n+1} - N_x)(F_m - F_l) + (N_x - N_n)(F_{m+1} - F_{l+1})}$$

where $I_k$ and $I_{k+1}$ are adjacent discrete armature currents, similar to $X'_2 I_a$ and $X'_3 I_a$, respectively, in FIG. 8 and are stored in the memory. The second arithmetic unit 23 is provided for conducting the processing mentioned above when $F_x$, $N_x$ are determined. The resultant $I_x$ is converted to a corresponding voltage by a D/A converter 55 and passed through the switch 28 to control amplifier 13.

This processing is conducted each time $N_x$ or $F_s$ changes. In fact, in order to increase the control response, the processing is continuously conducted. The time required for the processing, 10 msec, is the maximum control response speed.

When a speedier response is required, values or $I_s$ corresponding to all possible combinations of $N_x$, $F_s$ assumed during the operation of the dynamometer should be in advance obtained in the same way as above and stored in the memory 56. In the operation of the dynamometer, such data are then read out for use.

If $N_x$ varies from 0 to 100 km/h in increments or decrements of 1km/h and $F_s$ varies from $-50$ to 500 kg in increments or decrements of 1 kg, a memory capacity of $100 \times 1000$ words will be needed.

In FIG. 7, the central controller 50 sequentially reads out values of $N_x$, $F_s$, $I_k$, $I_{k+1}$, shown as $N_o$, $F$, $I$ in FIG. 6, from an output circuit 45 of the first arithmetic and memory unit 22 and calculates values of $I_s$ corresponding to all values of $F_s$, $N_x$ in advance and stores them in the memory. During operation, when $N_x$, $F_s$ are given, the central controller reads the Is corresponding to the $N_x$, $F_x$ from the memory and sends them to D/A converter 55, and thence the corresponding analog current signals are sent to switch 28.

The above explanation of Lagrangian interpolation may be restated referring to FIG. 8 as follows.

Assuming now that the targeted control load $F_s$ and the speed $N_x$ are placed in the illustrated positions, the second arithmetic and memory unit 23 and more particularly the central controller 50 reads from the first memory unit 22 out the loads $F_{a1}$ to $F_{c1}$, $F_{a2}$ to $F_{c2}$, and $F_{a3}$ to $F_{c3}$ lying on respective load lines of armature currents $x_1'I_a$, $x_2'I_a$ and $x_3'I_a$ intersected by speed lines $N_a$, $N_b$ and $N_c$. First, Lagrangian interpolation is applied in the arithmetic section 54 to the loads $F_{a1}$ to $F_{c1}$ and the speeds $N_a$ to $N_c$, the loads $F_{a2}$ to $F_{c2}$ and the speeds $N_a$ to $N_c$, and the loads $F_{a3}$ to $F_{c3}$, respectively so as to obtain loads $F_{x1}$, $F_{x2}$ and $F_{x3}$ corresponding to the speed $N_x$ and then Lagrangian interpolation is applied again to the obtained loads $F_{x1}$ to $F_{x3}$ and the armature currents $x_1'I_a$ to $x_3'I_a$ so as to obtain a targeted control current $I_s$ corresponding to the targeted control load $F_s$. It is to be understood, of course, that the same result can be obtained by first applying Lagrangian interpolation to the loads on the respective speed lines $N_a$, $N_b$ and $N_c$ and the armature currents so as to obtain armature currents corresponding to the targeted control load $F_s$ and then applying Lagrangian interpolation to the obtained armature currents and the speeds $N_a$, $N_b$ and $N_c$ so as to obtain a targeted control current $I_s$ corresponding to the speed $N_x$. Alternatively, the first arithmetic and memory unit 22 may be constructed so as to have an increased capacity to store the loads lying on load lines of respective armature currents at every smaller speed so that the loads $F_{x1}$ to $F_{x3}$ can be directly read without the need for the application of Lagrangian interpolation to obtain the loads $F_{x1}$ to $F_{x3}$ or instead, a memory such as shown at 56 in FIG. 7 may include a section for the same purpose. It is to be understood, of course, that linear interpolation is applied between two values if sufficient.

As a result, the targeted control load $F_s$ is converted into a targeted control current $I_s$ corresponding thereto and the targeted control current $I_s$ is introduced through the switch 28 to the control amplifier 13.

Although the present invention has been described in connection with a method and apparatus wherein dynamometer load values are calculated and stored, it is to be noted that dynamometer power values may be calculated from the times measured in the multistage preset timer 21 and the corresponding preset speed levels in accordance with the equation given by $$P \propto FN \simeq K_2 \frac{(N_{i+1}^2 - N_i^2)}{T_i} \qquad (4)$$

where $N_i$ is one preset speed level, $N_{i+1}$ is the next preset speed level, $T_i$ is the time it takes the dynamometer speed to vary from the one preset speed level to the next preset speed level, and $K_2$ is a constant, in which case the calculated power values are stored together with the corresponding dynamometer speed and armature current values and proper power, speed and current values are read out in accordance with the product of a given targeted control load and dynamometer speed for calculation of a targeted control current corresponding to the targeted control load using interpolation.

In addition, the second arithmetic and memory unit 23 may be constructed so as to calculate a targeted control current from a targeted control load $F_s$ and a dynamometer speed $N_x$ using the polynominal approximation of the relationship among the speed, load and current values stored in the first arithmetic and memory unit 22 which is given, for example, by $$I_s = a + f_1(N_x) \cdot F_s + f_2(N_x) \cdot F_s^2 + \ldots \qquad (5)$$

While the present invention has been particularly shown and described with reference to preferred embodiments thereof, it will be understood by those skilled in the art that the foregoing and other changes in form and details may be made therein without departing from the spirit and scope of the present invention.

What is claimed is:

1. A dynamometer load control method comprising the steps of measuring each time value it takes the dynamometer speed to vary from a preset speed level to the next preset speed level while the dynamometer is driven or coasted with a plurality of armature currents properly selected between $-100\%$ and $+100\%$ of the rated armature current, calculating dynamometer load values from the measured time values and the corresponding preset speed levels, storing the calculated load values together with the average speeds of the corresponding preset speed level pairs and the corresponding armature current values, and reading proper load, speed and current values in accordance with a targeted control load and a dynamometer speed to calculate a targeted control current corresponding to the targeted control load using interpolation.

2. A dynamometer load control method as set forth in claim 1, wherein the dynamometer load values are calculated from the measured time values and the corresponding preset speed levels in accordance with the equipment which is expressed by $F=K_1 \cdot (N_{i+1}-N_i)/T_i$, where $N_i$ is one preset speed level, $N_{i+1}$ is the next preset speed level, $T_i$ is the time value it takes the dynamometer speed to vary from the one preset speed level to the next preset speed level, and $K_1$ is a constant.

3. A dynamometer load control method comprising the steps of measuring each time value it takes the dynamometer speed to vary from a preset speed level to the next preset speed level while the dynamometer is driven or coasted with a plurality of armature currents properly selected between $-100\%$ and $+100\%$ of the rated armature current, calculating dynamometer power values from the measured time values and the corresponding preset speed levels, storing the calculated power values together with the average speeds of the corresponding preset speed level pairs and the corresponding armature current values, and reading proper power, speed and current values in accordance with the product of a targeted control load and a dynamometer speed to calculated a targeted control current corresponding to the targeted control load using interpolation.

4. A dynamometer load control method as set forth in claim 3, wherein the dynamometer power values are calculated from the measured time values and the corresponding preset speed levels in accordance with the equipment which is expressed by $P=K_2 \cdot (N_{i+1}^2-N_i^2)/T_i$, where $N_i$ is one preset speed level, $N_{i+1}$ is the next preset speed level, $T_i$ is the time value it takes the dynamometer speed to vary from the one preset speed level to the next preset speed level, and $K_2$ is a constant.

5. A dynamometer load control apparatus comprising a reference current generator for providing a plurality of reference currents properly selected between $-100\%$ and $+100\%$ of the rated armature current for driving or coasting the dynamometer with the reference currents flowing through the armature of the dynamometer, a multistage preset timer having a number of preset speed levels for measuring each time value it takes the dynamometer speed to vary from a preset speed level to the next preset speed level while the dynamometer is driven or coasted with the respective armature currents, a first arithmetic and memory unit for calculating dynamometer load values for the respective armature currents from the measured time values and the corresponding preset speed levels and storing the calculated load values together with the average speeds of the corresponding preset speed level pairs and the corresponding armature currents, and a second arithmetic and memory unit responsive to a targeted control load and a dynamometer speed for reading out proper load, speed and current values stored in the first arithmetic and memory unit to provide a targeted control current corresponding to the targeted control load using interpolation.

6. A dynamometer load control apparatus as set forth in claim 5, wherein the first arithmetic and memory unit is constructed to calculate the dynamometer load values from the measured time values and the corresponding preset speed levels in accordance with the equipment which is given by $F=K_1 \cdot (N_{i+1}-N_i)/T_i$, where $N_i$ is one preset speed level, $N_{i+1}$ is the next preset speed level, $T_i$ is the time value it takes the dynamometer speed to vary from the one preset speed level to the next preset speed level, and $K_1$ is a constant.

7. A dynamometer load control apparatus comprising a reference current generator for providing a plurality of reference currents properly selected between $-100\%$ and $+100\%$ of the rated armature current for driving or coasting the dynamometer with the reference currents flowing through the armature of the dynamometer, a multistage preset timer having a number of preset speed levels for measuring each time value it takes the dynamometer speed to vary from a preset speed level to the next preset speed level while the dynamometer is driven or coasted with the respective armature currents, a first arithmetic and memory unit for calculating dynamometer power values for the respective armature currents from the measured time values and the corresponding preset speed levels and storing the calculated power values together with the average speeds of the corresponding preset speed level pairs and the corresponding armature currents, and a second arithmetic and memory unit responsive to the product of a targeted control load and a dynamometer speed for reading out proper power, speed and current values stored in the first arithmetic and memory unit to provide a targeted control current corresponding to the targeted control load using interpolation.

8. A dynamometer load control apparatus as set forth in claim 7, wherein the first arithmetic and memory unit is constructed to calculate the dynamometer power values from the measured time values and the corresponding preset speed levels in accordance with the equipment expressed by $P=K_2 \cdot (N_{i+1}^2-N_i^2)/T_i$, where $N_i$ is one preset speed level, $N_{i+1}$ is the next preset speed level, $T_i$ is the time value it takes the dynamometer speed to vary from the one preset speed level to the next preset speed level, and $K_2$ is a constant.

9. A dynamometer load control apparatus as set forth in any of claim 5 to 8 wherein the second arithmetic and memory unit is constructed so as to calculate the targeted control current from the targeted control load and the dynamometer speed using the polynominal approximation of the relationship among the speed, load and current values stored in the first arithmetic and memory unit, which approximation is given by $I_s=a+f_1(N) \cdot F+f_2(N) \cdot F^2+\ldots$ where $I_s$ is the targeted control current, N is the dynamometer speed and a, $f_1$, $f_2 \ldots$ are constants.

* * * * *

UNITED STATES PATENT AND TRADEMARK OFFICE
CERTIFICATE OF CORRECTION

PATENT NO. : 4,257,261
DATED : March 24, 1981
INVENTOR(S) : Masamichi Ono, Akira Eto, Hideji Yagi It is certified that error appears in the above—identified patent and that said Letters Patent is hereby corrected as shown below:

Column 3, line 44 "-100% and -100%" should be -- -100% and +100%--

Column 4, line 48 "Scisakusho" should be --SEISAKUSHO--

Column 5, line 58 "the" should be --these--

Column 6, line 13 cancel "K.K."

line 14 cancel "Applicant," and insert --K.K.-- line 22 "($N_2$, $B_{b2}$)" should be --($N_{b2}$, $N_{b2}$)-- line 26 "m.dN/dt" should be --$F=m.\dfrac{dN}{dt}$-- line 37 "m.($N_b$-$N_a$)/$T_i$" should be --$F=m.\dfrac{N_b-N_a}{T_i}$--

Column 8, line 5 "I1, I2" should be --$I_1$, $I_2$-- line 6 "F1, F2" should be --$F_1$, $F_2$--

Claim 3, line 15 change "calculated" to --calculate--

Signed and Sealed this

Seventeenth Day of November 1981

[SEAL]

Attest:

GERALD J. MOSSINGHOFF

Attesting Officer    Commissioner of Patents and Trademarks